United States Patent

[11] 3,615,221

| [72] | Inventor | Donald McMillan<br>Wilmington, Del. |
|---|---|---|
| [21] | Appl. No. | 818,028 |
| [22] | Filed | Apr. 21, 1969 |
| [45] | Patented | Oct. 26, 1971 |
| [73] | Assignee | E. I. du Pont de Nemours and Company<br>Wilmington, Del. |

[54] PROCESS FOR REDUCTION OF SULFUR DIOXIDE WITH HYDROCARBON VAPOR
7 Claims, 1 Drawing Fig.

| [52] | U.S. Cl. | 23/226, 23/181 |
|---|---|---|
| [51] | Int. Cl. | C01b 17/04 |
| [50] | Field of Search | 23/225–226, 181 |

[56] References Cited
UNITED STATES PATENTS

| 1,917,685 | 7/1933 | Bacon et al. | 23/226 |
|---|---|---|---|
| 2,021,372 | 11/1935 | Mast | 23/178 |
| 2,985,586 | 11/1960 | Barber | 23/225 |
| 3,199,955 | 8/1965 | West | 23/226 |
| 3,476,513 | 11/1969 | Welty et al. | 23/225 |

FOREIGN PATENTS

| 596,613 | 4/1960 | Canada | 23/226 |
|---|---|---|---|

Primary Examiner—Oscar R. Vertiz
Assistant Examiner—G. O. Peters
Attorney—E. Leigh Hunt ABSTRACT: A process is disclosed for reducing sulfur dioxide to hydrogen sulfide and sulfur by:
1. mixing sulfur dioxide with a hydrocarbon vapor;
2. preheating the mixture to 500°–560° C;
3. mixing the preheated material with the combustion products of a hydrocarbon;
4. converting a portion of the sulfur dioxide to hydrogen sulfide and sulfur; and,
5. cooling the converted material.

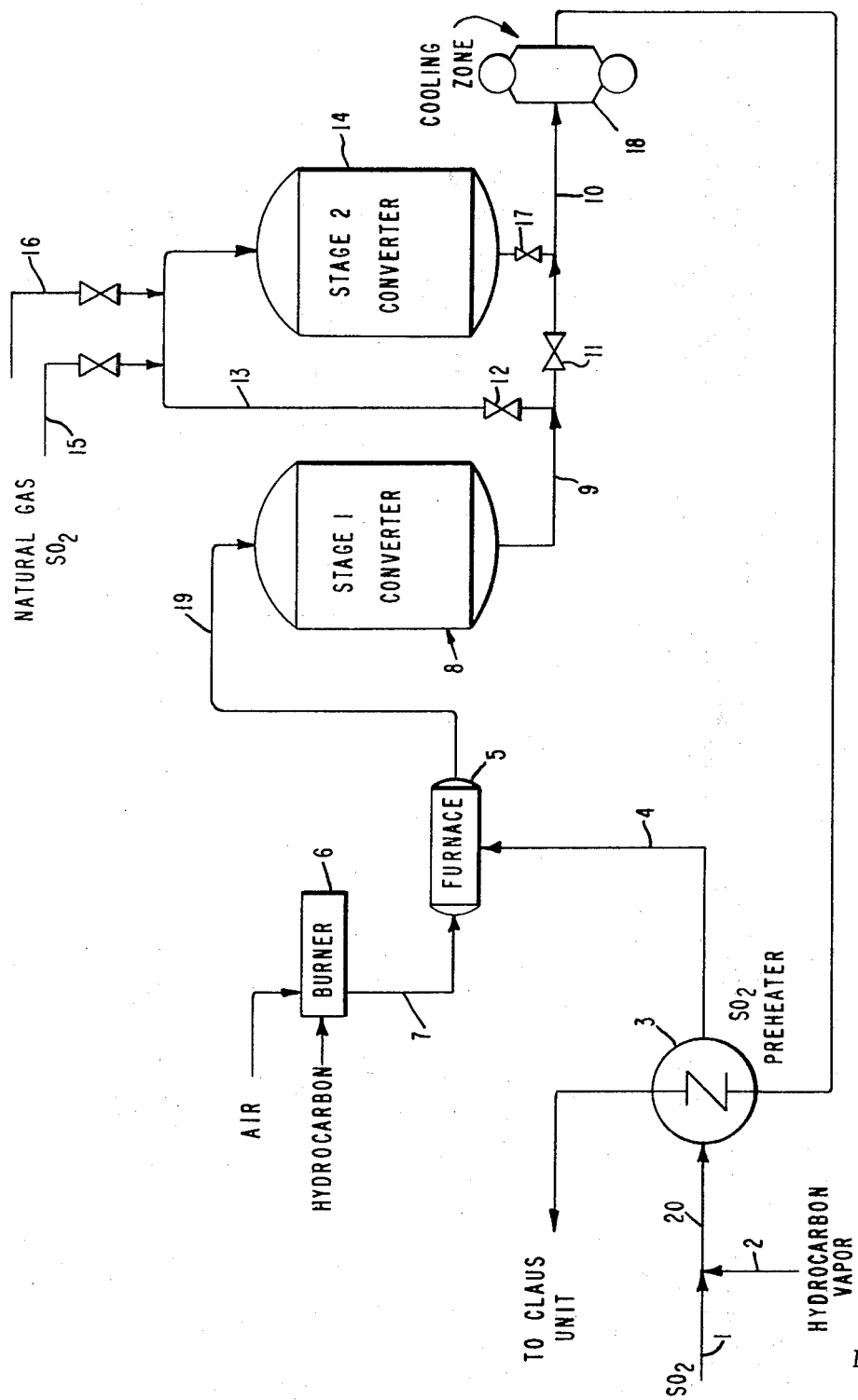

PROCESS FOR REDUCTION OF SULFUR DIOXIDE WITH HYDROCARBON VAPOR

BACKGROUND OF THE INVENTION

The prior art discloses methods for reducing sulfur dioxide. An example is the disclosure of U.S. Pat. No. 3,199,955 issued Aug. 10, 1965, to West et al.; the disclosure of which is incorporated herein by reference. While the process of West et al. is satisfactory in many regards, it has been found that it suffers from two major disadvantages. First, in preheating the sulfur dioxide to a temperature at which it may be reduced, corrosion problems exist and these problems limit the nature and useful life of the equipment used to accomplish preheating. Second, the West et al. process does not completely utilize all of its starting materials and accordingly it not as economical as might be desired. It is believed that the present process overcomes the above mentioned disadvantages.

SUMMARY

The present inventions is directed to a process of reducing sulfur dioxide to a mixture having a molar ration of hydrogen sulfide and equivalent gases to sulfur dioxide of about 2:1 comprising:
1. mixing (a) a gas stream containing at least about 5.0 percent by volume of sulfur dioxide with (b) a hydrocarbon vapor;
2. preheating the mixture of step 1 in a preheat zone to raise the temperature of the sulfur dioxide to within the range of from about 500° C. to about 560° C.;
3. mixing the product of step 2 with the combustion products of a hydrocarbon to raise the temperature of the sulfur dioxide to within the range of from about 650° C. to about 1,050° C.;
4. contacting the products of step 3 at a temperature of less than 1,100° C. with a catalytic amount of a catalyst selected from the group consisting of (i) gamma-alumina; (ii) bauxite; (iii) mixtures of gamma-alumina and bauxite; and (iv) supported catalysts selected from the group consisting of: the oxides of manganese, chromium, barium, strontium, calcium, and tantalum; the rare earth chromites; and mixtures thereof, the supported catalysts containing stabilizing amounts of either thoria or lanthanum oxide; and
5. cooling the products of step 4 to a temperature below about 650° C. in a cooling zone by heat transfer with a fluid heat transfer medium, the temperature of the heat transfer medium being maintained below about 270° C.

The present process avoids for the most part corrosion problems encountered in the preheating of the sulfur dioxide-hydrocarbon vapor mixture, provides a means of delivering a sulfur dioxide-hydrocarbon vapor mixture at a constant temperature in the range of from 650° C. to 1,050° C. to a converter zone, and allows proper adjustment of (1) the converter operating temperature to obtain substantially complete utilization of the hydrocarbon vapor used.

DESCRIPTION OF THE PROCESS

Referring to the drawing, a gas stream 1 containing at least about 5 percent by volume of sulfur dioxide is mixed with a hydrocarbon vapor stream 2. The hydrocarbon vapor may be any material which will react with sulfur dioxide and oxygen according to the following equations:

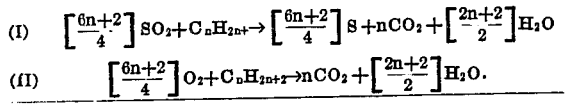

When the hydrocarbon vapor is methane, the equations are:
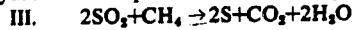
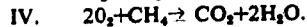

Suitable sources of hydrocarbon vapor are natural gas (which consists largely of methane), methane, ethane, propane, and butane. Other hydrocarbons such as ethylene, propylene, and refinery gases can be used but are generally more expensive. The ratio of sulfur dioxide to hydrocarbon vapor should be such that a hydrogen sulfide to sulfur dioxide ratio of from 1.5:1.0 to 2.9:1.0 is obtained in the effluent gases from the converters. In a great many instances this will be accomplished by using amounts of sulfur dioxide and hydrocarbon vapor which essentially satisfy the stoichiometry of equations I and II above. The hydrogen sulfide to sulfur dioxide ratio in the converter effluent is also, however, dependent upon the temperature and equilibrium conditions achieved in the converters. It should be noted that the effluent gases will generally contain residual amounts of CO, $H_2$, and COS gases. These latter gases are, for the purposes of this invention, considered to be equivalent to hydrogen sulfide since they will subsequently react to reduce sulfur dioxide in the Claus reaction.

The sulfur dioxide-hydrocarbon vapor mixture is then heated from the delivery temperature to a temperature in the range of from about 509° C. to about 560° C. in an $SO_2$ preheater 3. The preheater may be a conventional shell and tube heat exchanger made of any material of construction which will withstand temperatures up to 600° C. such as stainless steel or "Alonized" steel. Heat can be supplied to the $SO_2$ preheater from either a source external to the present process (not shown in the drawing) or by cooling the final product stream of the present process (as shown in the drawing). In general, it is desirable that the tube walls of the $SO_2$ preheater not exceed about 585° C.

After the initial preheat step, the sulfur dioxide-hydrocarbon vapor mixture is transferred via line 4 to a steel, refractory lined furnace 5 where it is admixed with the combustion products of a hydrocarbon to thereby raise the temperature of the sulfur dioxide to a temperature in the range of from 650° C. to 1,050° C., preferably 680° C. to 750° C., and more preferably about 700° C. The combustion products can be prepared by burning a hydrocarbon, such as natural gas, fuel oil, methane, propane, or butane, in a burner 6 and transferring the combustion products to the refractory lined furnace 5 via line 7 where they are mixed with the sulfur dioxide-hydrocarbon vapor stream. The furnace should be refractory lined so as to withstand the high temperatures reached therein. Mixing in the refractory furnace can be promoted by refractory baffles within the furnace. Alternatively, the combustion and mixing can occur in a single vessel (not shown). The hydrocarbon can be burned with air preheated to 550° C. in one area of the furnace and mixed with the sulfur dioxide-hydrocarbon vapor in a second area, baffles being used to separate the two areas. The temperature of the exit gases from refractory furnace 5 can be controlled by the amount of hydrocarbon burned in burner 6.

The next step is to convert catalytically a portion of the sulfur dioxide to a mixture of hydrogen sulfide and sulfur. This is accomplished by contacting the sulfur dioxide with a catalytic amount of a catalyst selected from the group consisting of (i) gamma-alumina; (ii) bauxite; (iii) mixtures of gamma-alumina and bauxite; and (iv) supported catalyst selected from the group consisting of: the oxides of manganese, chromium, barium, strontium, calcium, and tantalum; the rare-earth chromites; and mixtures thereof, the supported catalysts containing stabilizing amounts of either thoria or lanthanum oxide; the supported catalysts (iv) being more fully described in applicant's assignee's U.S. Pat. application docket number 4,237–G entitled "Process for the Economical Use of Refractory Reducing Gases for the Reduction of Sulfur Dioxide," filed by Alvin B. Stiles concurrently herewith. The supported catalysts contain a thermal stabilizer to help prevent decreases in catalytic activity at high temperature due to loss in catalyst surface area. Suitable stabilizers include thoria or lanthanum oxide, with thoria being preferred. The preferred catalysts are those which contain manganese oxide and optionally chromium oxide and thoria. When the catalysts contains both manganese oxide and chromium oxide, they should be present in a molar ratio of manganese to chromium of from 0.5:3.0 to 10.0:1.0. The amount of thoria can vary between 0.5 percent and 25 percent, by weight, of the total weight of the catalyst and support. The most preferred catalyst contains 5 percent, by weight, of each of manganese oxide, chromium oxide, and thoria supported on eta or kappa alumina. In general, the catalysts used in the present process will have surface areas of from about 10 m.²/gram to 200 m.²/gram.

The sulfur dioxide is contacted with the catalyst and partially converted to hydrogen sulfide and sulfur in converter 8. That part of the sulfur dioxide which is converted, converts as discussed in West et al. according to the equation:

V. $SO_2$ + Hydrocarbon Gas → $H_2S + S + CO_2 + H_2O + CO + H_2 + COS$.

The temperature in the converter must be maintained below 1,100° C. to avoid damage to the catalyst. The preferred operating temperature is about 845° C. If the content of the $SO_2$ in feed stream 1 is relatively low, i.e. 5 percent to 20 percent, by volume, then only one converter will be required and flow from the converter 8 to subsequent cooling will be via lines 9 and 10 and valve 11. As the $SO_2$ content in stream 1 increases, it may become more difficult to maintain the converter temperature below 1,100° C. The temperature can be controlled by closing valve 11 and directing flow to a second converter via valve 12 and line 13, to converter 14. Cool sulfur dioxide and hydrocarbon vapor is bled into the system via lines 15 and 16, respectively. The sulfur dioxide and hydrocarbon vapor acts as a cooling means and thereby permits control of the temperature. Flow from the second converter 14 to subsequent cooling means will be via valve 17 and line 10. The size and number of converters required is a matter of engineering design and will be controlled by such variables as (1) content of $SO_2$ in stream 1, (2) size of converters, (3) volume of gas through the converters, (4) nature of catalyst and the like. The converters can be manufactured of any suitable material of construction which will withstand temperatures of 1,100° C. such as refractory lined steel vessels.

Essentially all the hydrocarbon vapor is consumed under the preferred operating conditions. Accurate temperature control is essential since under any given conditions of flow rates and catalyst activity, if the converter inlet temperature is allowed to drop as little as 40° C. below the optimum temperature, appreciable hydrocarbon leakage can be detected in the gas stream leaving the converter.

Gases from the converter flow via line 10 to a cooling zone 18 where they are cooled to below about 650° C. by heat transfer with a fluid heat transfer medium. The temperature of the heat transfer medium should be maintained below approximately 270° C. to keep the temperature of the wall of the equipment relatively cool so as to avoid corrosion on the gas wide of the heat transfer equipment. Suitable heat transfer mediums are water, "Dowtherm," steam, or air forced convections. The gases from the cooling zone may be sent directly to a Claus unit (not shown) where the sulfur dioxide and hydrogen sulfide are converted to sulfur and water:

$$SO_2 + 2H_2S \rightarrow 3S + 2H_2O$$
$$SO_2 + 2_2 \rightarrow W + 2H_2O$$
$$SO_2 + 2CO \rightarrow 2CO_2 + S$$
$$SO_2 + 2COS \rightarrow 2CO_2 + 3S.$$

Alternatively, the heat contained in the gases may be used to preheat the sulfur dioxide in preheater 3 and thereafter sent to the Claus unit (not shown).

The following examples illustrate the nature of the invention.

EXAMPLE 1

98 volumes per hour of a gas having the following composition:

| Material | Volume % |
|---|---|
| $SO_2$ | 11.9 |
| $O_2$ | 0.5 |
| $H_2O$ | 4.5 |
| $N_2$ | 83.1 | is compressed to about 1.4 atmospheres and mixed at 30° C. with 6.3 volumes per hour of natural gas containing more than 95 percent methane. This gas mixture is preheated to 550° C. by $SO_2$ preheater 3 and fed to the preheat furnace 5 through line 4.

1.02 volumes per hour of natural gas and 10.2 volumes per hour of preheated air at 550° C. are burned in burner 6 and the combustion products fed to the preheat furnace 5. In the furnace the products of combustion from the burner are mixed with the $SO_2$—$CH_4$ gas mixture and leave the furnace at 690° C. through line 19. This results in a feed of 115 volumes per hour to converter 8 containing:

| Material | Volume % |
|---|---|
| $SO_2$ | 10.1 |
| $CH_4$ | 5.3 |
| $CO_2$ | 0.9 |
| $H_2O$ | 5.6 |
| $O_2$ | 0.5 |
| $N_2$ | 77.6 |

In converter 8 these gases are passed over 0.068 volumes of catalyst.

The catalyst is prepared as follows. 1,000 parts of aluminum hydroxide is calcined at 600° C. for 3 hours in air to convert the aluminum hydroxide to aluminum oxide and oxidize and remove any carbonaceous materials. Approximately 3 hours exposure as a layer no greater than 1 inch thick at 600° C. will suffice both to decompose the hydroxide and oxidize any carbonaceous impurity. 400 parts of the calcined alumina hydrate is charged to a suitable sized ceramic ball mill containing a mixture of one-half, three-fourths, and 1 inch ceramic balls. There is also charged to the ball mill 122 parts of chromium tetranitrate tetrahydrate, 61 parts of chromium trinitrate nonahydrate, 149 parts of manganese dinitrate as a 50 percent solution in water (74.5 parts of anhydrous manganese dinitrate), 37 parts of 70 percent nitric acid solution, and 7,000 parts of distilled water. The ball mill is rotated for 6 hours is sufficient to produce a uniform paste. The paste is removed from the ball mill and placed in Inconel dishes. The wet paste is dried, then is finally calcined at 1,000° C. for 5 hours. The calcined catalyst when cool is crushed and screened into 8 to 12 mesh granules for use in the subsequent operation. The granular catalyst upon analysis has a surface area of 64 m.²/gram. It should be noted that instead of using the catalyst as a granular material it can be pulverized to 100 percent through a 10 mesh screen, mixed with 1 percent graphite, and pilled to form 150 -inch ×⅛-inch cylinders as an example. Other shapes and forms are also useful.

The exothermic heat of the reaction in converter 8 increases the gas temperature to 844° C. at the exit of the converter; the pressure is 1.3 atmospheres. Chromatographic analysis of samples of the gas stream at the exit of the converter shows that this stream is essentially free of $CH_4$ or other hydrocarbons. The product is 120 volumes per hour of a gas having the following composition:

| Material | Volume % |
|---|---|
| $SO_2$ | 1.5 |
| $H_2S$ | 2.5 |
| S | 2.8 |
| $CO_2$ | 5.8 |
| $H_2O$ | 12.7 |
| $N_2$ | 74.3 |
| CO | 0.4 |
| COS | 0.4 |
| $H_2$ | 0.4 |

The converter products are transferred via lines 9 and 10 to cooling zone 18 where they are cooled to 620° C. in a waste heat steam boiler (shown as 18 on the drawing) and to 400° C. in $SO_2$ preheater 3 and thereafter passed on to a Claus unit where complete reduction of the sulfur dioxide and hydrogen sulfide to sulfur is accomplished.

EXAMPLE 2

The same volume and composition of $SO_2$—$CH_4$ containing gases are fed to the system as in example 1. However, the temperature of the preheated gas mixture leaving $SO_2$ preheater 3 is 510° C. and the amount of preheated air and methane fed to burner 6 is not increased to compensate for this lower temperature. Using the same catalyst as in example 1, results in a temperature of 807° C. at the exit of converter 8. Under these conditions utilization of the $CH_4$ is not complete and the gas stream in line 10 contains 0.2—0.3 percent of $CH_4$, thus decreasing natural gas utilization from above 99 percent. It is obvious that more efficient operation of the converter could be reestablished by increasing the flow of preheated air and natural gas to burner 6 until the exit temperature of the first stage converter again reaches 846° C.

EXAMPLE 3

129 volumes per hour of gas containing:

| Material | Volume % |
| --- | --- |
| $SO_2$ | 9.1 |
| $O_2$ | 0.4 |
| $H_2O$ | 27.4 |
| $N_2$ | 63.1 | are mixed with 6.3 volumes of natural gas and passed to $SO_2$ preheater 3 where the $SO_2$—$CH_4$ gas mixture is heated to 550° C. It is then passed through line 4 to the preheat furnace 5. 1.45 volumes per hour of natural gas and 14.6 volumes per hour of air preheated to 550° C. are burned and the high temperature products of their combustion fed to the preheat furnace where they are mixed with the $SO_2$—$CH_4$ mixture within the baffled furnace. The resulting gas mixture leaves the preheat furnace at 700° C. and has the following composition:

| Material | Volume % |
| --- | --- |
| $SO_2$ | 7.7 |
| $CH_4$ | 4.1 |
| $CO_2$ | 1.0 |
| $H_2O$ | 25.3 |
| $O_2$ | 0.4 |
| $N_2$ | 61.5 |

151 volumes per hour of this gas mixture to converter 8 passes through 0.089 volumes of the catalyst described in example 1. The exothermic heat of reactions increase the gas temperature to 830° C. at the exit of converter 8 at a pressure of 1.3 atmospheres absolute. Analysis of samples of this gas stream shows that essentially all the $CH_4$ or other hydrocarbons have been consumed.

EXAMPLE 4

98 volumes per hour of gas containing:

| Material | Volume % |
| --- | --- |
| $SO_2$ | 11.9 |
| $O_2$ | 0.5 |
| $H_2O$ | 4.5 |
| $N_2O$ | 83.1 | is compressed to about 1.4 atmospheres absolute and then mixed with 6.2 volumes per hour of natural gas. This gas mixture is preheated to 550° C. in $SO_2$ preheater 3.

In this case the final preheating of the $SO_2$—$CH_4$ gas mixture to 680° C. is accomplished by an indirect fired steel and tube heat exchanger (not shown). The 104 volumes per hour of gas feed to the converter has the following composition:

| Material | Volume % |
| --- | --- |
| $SO_2$ | 11.3 |
| $CH_4$ | 5.8 |
| $H_2O$ | 4.2 |
| $O_2$ | 0.5 |
| $N_2$ | 78.3 |

In the converter these gases are passed over 0.061 volumes of the catalyst prepared as described in example 1 and they leave the converter at 846° C. Analysis of samples of the converter product again shows that they are substantially free of $CH_4$ and other gaseous hydrocarbons. Thus, the use of a high temperature indirect fired preheated furnace which is costly to maintain and operate shows no advantage over the use of the preheat furnace discussed in example 1.

EXAMPLE 5

44.8 volumes per hour of purified $SO_2$ gas containing in excess of 99 percent $SO_2$ by volume is delivered through line 1 at about 100° C. 12.6 volume per hour of natural gas containing in excess of 95 percent methane is mixed with the $SO_2$ and fed through line 20 to the $SO_2$ preheater 3 where this gas mixture is heated to 550° C. utilizing the hot products from converter 14 as a source of heat. The $SO_2$—$Ch_4$ gas mixture then passes through line 4 to the preheat furnace 5.

1.2 volumes per hour of natural gas and 12.3 volumes per hour of air preheated to 550° C. are fed to the preheat furnace burner. In this furnace the high temperature products of combustion from the burner are mixed directly with the $SO_2$—$CH_4$ gas mixture and leave the furnace at 800° C. 70 volumes per hour of the heated gas mixture are fed to converter 8 via line 19. The gas to the converter has the following composition:

| Material | Volume % |
| --- | --- |
| $SO_2$ | 63.0 |
| $CH_4$ | 17.7 |
| $CO_2$ | 1.7 |
| $H_2O$ | 3.6 |
| $O_2$ | 0.2 |
| $N_2$ | 13.8 |

In converter 8 the gas mixture is passed through catalyst bed containing 0.042 volumes of 8—12 mesh gamma-alumina which had been calcined 12 hours at 1,100° C. in air before placing the catalyst in the converter. The exothermic heat of the reactions increases the temperature of the gas to 1,045° C. at the exit of this converter. Analysis of samples of this gas stream shows it to be substantially free of methane or other gaseous hydrocarbons.

83.1 volumes per hour of gas leaving converter 8 are mixed with an additional 7.3 volumes per hour of purified $SO_2$ delivered at 100° C. in line 15 and 13.5 volumes per hour of natural gas delivered at 25° C. in line 16. The resulting gas mixture of 104 volumes per hour is fed at 876° C. to converter 14. In this converter the gases pass through a catalyst bed containing 0.061 volumes of the same catalyst used in converter 8. The temperature of the gas leaving this converter rises to 1,045° C. and the gas stream again is free of methane or other hydrocarbons.

After cooling in the waste heat boiler to 640° C. and in the SO₂ preheater to 355° C., this gas stream is delivered to the sulfur recovery unit.

What is claimed is:

1. A process f reducing sulfur dioxide to a mixture having a molar ratio of hydrogen sulfide and equivalent gases to sulfur dioxide of about 2:1 comprising:
   1. mixing (a) a gas stream containing at least about 5.0 percent by volume of sulfur dioxide with (b) a hydrocarbon vapor;
   2. preheating the mixture of step 1 in a preheat zone to raise the temperature of the sulfur dioxide to within the range of from about 500° C. to about 560° C;
   3. mixing the products of step 2 with the combustion products of a hydrocarbon to raise the temperature of the sulfur dioxide to within the range of from about 650° C. to about 1,050° C;
   4. contacting the products of step 3 at a temperature of less than 1,109° C. with a catalytic amount of a catalyst selected from the group consisting of (i) gamma-alumina; (ii) bauxite; (iii) mixtures of gamma-alumina and bauxite; and (iv) supported catalysts selected from the group consisting of: the oxides of manganese, chromium, barium, strontium, calcium, and tantalum; the rare earth chromites; and mixtures thereof, the supported catalysts containing stabilizing amounts of either thoria or lanthanum oxide; and
   5. cooling the products of step 4 to a temperature below about 650° C. in a cooking zone by heat transfer with a fluid heat transfer medium, the temperature of the heat transfer medium being maintained below abut 270° C.

2. The process of claim 1 wherein the hydrocarbon vapor is natural gas.

3. The process of claim 1 wherein heat is supplied to the preheat zone by the product of step 5.

4. The process of claim 1 wherein the hydrocarbon vapor is methane.

5. The process of claim 1 wherein the heat transfer medium is boiling water.

6. The process of claim 1 wherein the temperature in step 4 is maintained below 1,109° C. by contacting the material of step 3 with the catalyst in two stages and adding both cool sulfur dioxide and a cool hydrocarbon vapor to the product of the first stage.

7. The process of claim 6 wherein the hydrocarbon vapor in steps 1 and 4 is natural gas.

* * * * *